United States Patent
Yoshinogawa

[19]

[11] Patent Number: 6,052,816
[45] Date of Patent: Apr. 18, 2000

[54] PROGRAMMABLE ROM AND PARITY PROGRAMMABLE ROM HAVING A CORRECTION CODING CIRCUIT

[75] Inventor: Kunio Yoshinogawa, Tokyo, Japan

[73] Assignee: NEC Corporation, Tokyo, Japan

[21] Appl. No.: 08/807,695

[22] Filed: Feb. 28, 1997

[30] Foreign Application Priority Data

Feb. 28, 1996 [JP] Japan ................................. 8-041042

[51] Int. Cl.[7] ........................... G11C 29/00; G06F 11/00
[52] U.S. Cl. ..................... 714/766; 714/773; 714/763; 714/764; 714/767; 714/768; 714/769
[58] Field of Search .................... 714/766, 733, 714/773, 734, 723, 719, 720, 722, 725, 763, 764, 768, 769

[56] References Cited

U.S. PATENT DOCUMENTS

| | | | |
|---|---|---|---|
| 4,706,249 | 11/1987 | Nakagawa et al. | 371/38 |
| 4,710,934 | 12/1987 | Traynor | 371/38 |
| 4,726,021 | 2/1988 | Horiguchi et al. | 371/38 |
| 4,761,783 | 8/1988 | Christensen et al. | 714/763 |
| 4,788,684 | 11/1988 | Kawaguchi et al. | 714/719 |
| 4,835,774 | 5/1989 | Ooshima et al. | 714/719 |
| 4,872,168 | 10/1989 | Andsen et al. | 714/720 |
| 4,958,345 | 9/1990 | Fujisaki | 714/720 |
| 4,958,346 | 9/1990 | Fujisaki | 714/720 |
| 5,383,205 | 1/1995 | Makihara et al. | 371/40.1 |
| 5,477,492 | 12/1995 | Ohsaki et al. | 365/200 |
| 5,544,149 | 8/1996 | Katayama et al. | 369/275.3 |
| 5,703,495 | 12/1997 | Sartwell et al. | 324/763 |

FOREIGN PATENT DOCUMENTS 0509485  10/1992  European Pat. Off. .

OTHER PUBLICATIONS

Michael David Quinn et al., "Dynamic Testing of Memory Arrays Which Utilize Error Checking and Correction (ECC) Logic", *Digest of Paper 1980 IEEE Test Conference,* Sep. 1980, pp. 238–252.

*Primary Examiner*—William Grant
*Assistant Examiner*—Ivan Calcano
*Attorney, Agent, or Firm*—Sughrue, Mion, Zinn, Macpeak & Seas, PLLC

[57] ABSTRACT

A semiconductor storage unit includes: a first PROM; a second PROM for storing parity data based on data stored in the first PROM; an error detecting circuit for detecting an error in read data outputted from the first PROM on the basis of the parity data outputted from the second PROM to generate an error detection signal; an error correcting circuit for outputting the data read out from the first PROM as it is when no error detection signal is supplied thereto, and for outputting error corrected data when the error detection signal is supplied thereto; a specific-mode detecting circuit for generating a specific-mode detection signal when detecting a specific mode; and a different-data generating means for generating data different from data outputted from the error correcting circuit as output data when both of the error detection signal and the specific-mode detection signal are generated.

2 Claims, 2 Drawing Sheets

PROGRAMMABLE ROM AND PARITY PROGRAMMABLE ROM HAVING A CORRECTION CODING CIRCUIT

BACKGROUND OF THE INVENTION

1. Field of the Invention

The present invention relates to a non-volatile semiconductor device, and more particularly to a non-volatile semiconductor storage unit having a correction coding circuit.

2. Description of the Related Art

In recent years, a programmable read only memory (PROM), which is one of non-volatile semiconductor devices, includes an error correcting code circuit (ECC circuit). The ECC circuit is a circuit that conducts, when an error occurs in data written in a memory cell, an error correction so that correct data is read out.

In general, it is assumed that an error in the data written in the memory cell is generated for the following three causes. A first cause is that a defect occurs in the memory cell at the stage of manufacturing a PROM. A second cause is that when data is written into the PROM, the data fails to be written into the memory cell. A third cause is that the data correctly written into the memory cell becomes defective thereafter. All of the data errors occurring for these three causes can be remedied by the ECC circuit. The first and second causes of these three causes occur at the time of manufacturing the PROM. If the ECC circuit of the PROM functions for the data errors occurring for these first and second causes, the ECC circuit can no longer conduct data correction with respect to new data error, or becomes an ECC that is reduced in the number of data which can be corrected. There arises such a problem that the PROM low in reliability is manufactured as a product.

Therefore, there is required to detect and remove the PROM where a defect occurs in data written into the memory cell at the manufacture stage or writing stage. Up to now, the check of data written into the memory cell is conducted by a method in which written data is read out to the exterior and it is examined whether the data is correctly written or not. The ECC built-in PROM includes, in addition to a memory cell that stores data, a parity memory cell that stores parity data which is produced from the stored data through calculation. In other words, it is necessary to read out the parity data to the exterior and check it.

Because the parity data is data which is automatically internally calculated from data to be written, when the parity data is checked externally, it is necessary to additionally provide the expected value of the parity data. Hence, the check of the parity data and the provision of the expected value are required, thereby leading to a problem that an excessive work is necessary. Furthermore, in order to read out data to the external and check it, there arises a problem that a PROM writer for a normal PROM cannot be used because a specific function is required.

SUMMARY OF THE INVENTION

In view of the above, an object of the present invention is to provide a semiconductor storage unit which is capable of detecting that a defect occurs in data written in a memory cell at a manufacturing stage or a writing stage without reading out data to the exterior.

In order to achieve the above object, according to the present invention, there is provided a semiconductor storage unit which comprises: a first PROM; a second PROM for storing parity data based on data stored in the first PROM; an error detecting circuit for detecting an error in read data outputted from the first PROM on the basis of the parity data outputted from the second PROM to generate an error detection signal; an error correcting circuit for outputting the data read out from the first PROM as it is when no error detection signal is supplied thereto, and for outputting error corrected data when the error detection signal is supplied thereto; a specific-mode detecting circuit for generating a specific-mode detection signal when detecting a specific mode; and a different-data generating means for generating data different from data outputted from the error correcting circuit as output data when both of the error detection signal and the specific-mode detection signal are generated.

BRIEF DESCRIPTION OF THE DRAWINGS

This above-mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENTS

Figure 1:
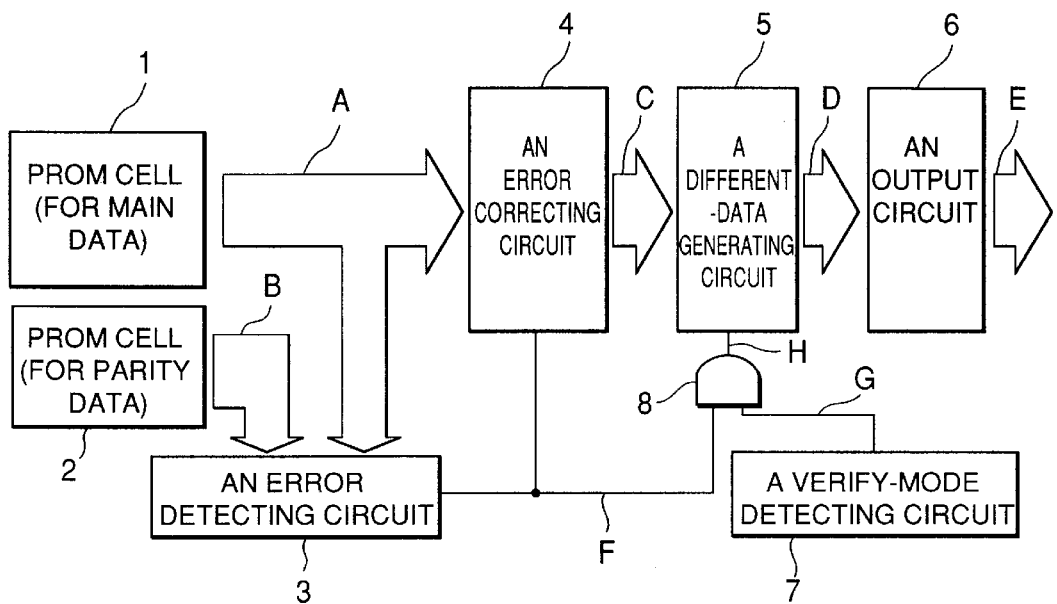
FIG. 1 is a block diagram showing a non-volatile semiconductor storage unit having a correction coding circuit in accordance with a first embodiment of the present invention.

Now, a description will be given in more detail of preferred embodiments of the present invention with reference to the accompanying drawings.

A PROM cell 1 for main data outputs main data A written therein to an error detecting circuit 3 and an error correcting circuit 4. A PROM cell 2 for parity data stores parity data B obtained from the main data A through internal calculation and outputs the stored parity data B to the error detecting circuit 3. Upon detection of an error, the error detecting circuit 3 outputs an error detection signal F to the error correcting circuit 4 and a two-input AND circuit 8. An output G from a verify-mode detecting circuit 7 is also inputted to the two-input AND circuit 8. The error correcting circuit 4 outputs data C to a different-data generating circuit 5. The different-data generating circuit 5 outputs an output signal D, which is responsive to an output signal H from the two-input AND circuit 8, to an output circuit 6, and the output circuit 6 outputs a final output E.

The error detecting circuit 3 compares the main data A with the parity data B to judge whether an error exists in the main data A or the parity data B, and outputs an error detection signal F of "H" level if there is an error, and an error detection signal F of "L" level if there is no error. The error correcting circuit 4 corrects the data if the error detection signal F is in "H" level with respect to the main data A, and outputs the data as the data C without any change if it is in "L" level.

Generally, a PROM is provided with a verify mode. The verify mode means a mode in which written data is read out to check the writing of data while a high voltage is kept immediately after data is written in a PROM cell at the high voltage.

The verify-mode detecting circuit 7 detects that reading has been conducted when a write power supply of the PROM is set to a higher voltage than a normal operation voltage, and outputs the signal G of H level. The two-input AND circuit 8 inputting the error detection signal F and the output signal G sets the output signal H to H level only when an error exists either in the main data A or in the parity data B and the mode is the verify mode, and requests the different-data generating circuit 5 to output the data D as data different from the data C.

Figure 2:
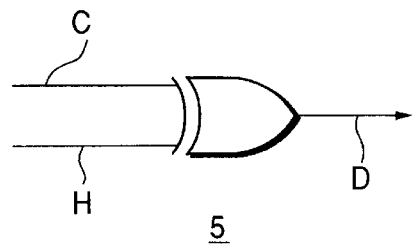
FIG. 2 is a circuit diagram showing a specific example of a different-data generating circuit shown in FIG. 1.

The different-data generating circuit 5 is made up of, for example, an exclusive OR circuit as shown in FIG. 2, and outputs data equivalent to the data C as the data D if the output signal H of the two-input AND circuit 8 is L level, and outputs data reverse to the data C as the data D if it is H level so that the signal D is outputted from the output circuit 6 to the exterior as the output signal E.

Since the output signal H of the two-input AND circuit is always L level except for the verify mode, the different-data generating circuit 5 allows the inputted data to be passed when it is in the read-out mode. If a defect occurs at the manufacturing stage or the writing stage, because the defect exists within the main data A or the parity data B when executing verification to verify writing, the error detection signal F becomes H level. Therefore, the output signal H of the two-input AND circuit 8 also becomes H level.

As a result, because the different-data generating circuit 5 outputs data different from the data C, that is, the reverse data of the data C as the data D, data different from the written data is outputted as the final output signal E. With the comparison of this data E with the written data, it is found that writing of data results in failure.

Figure 3:
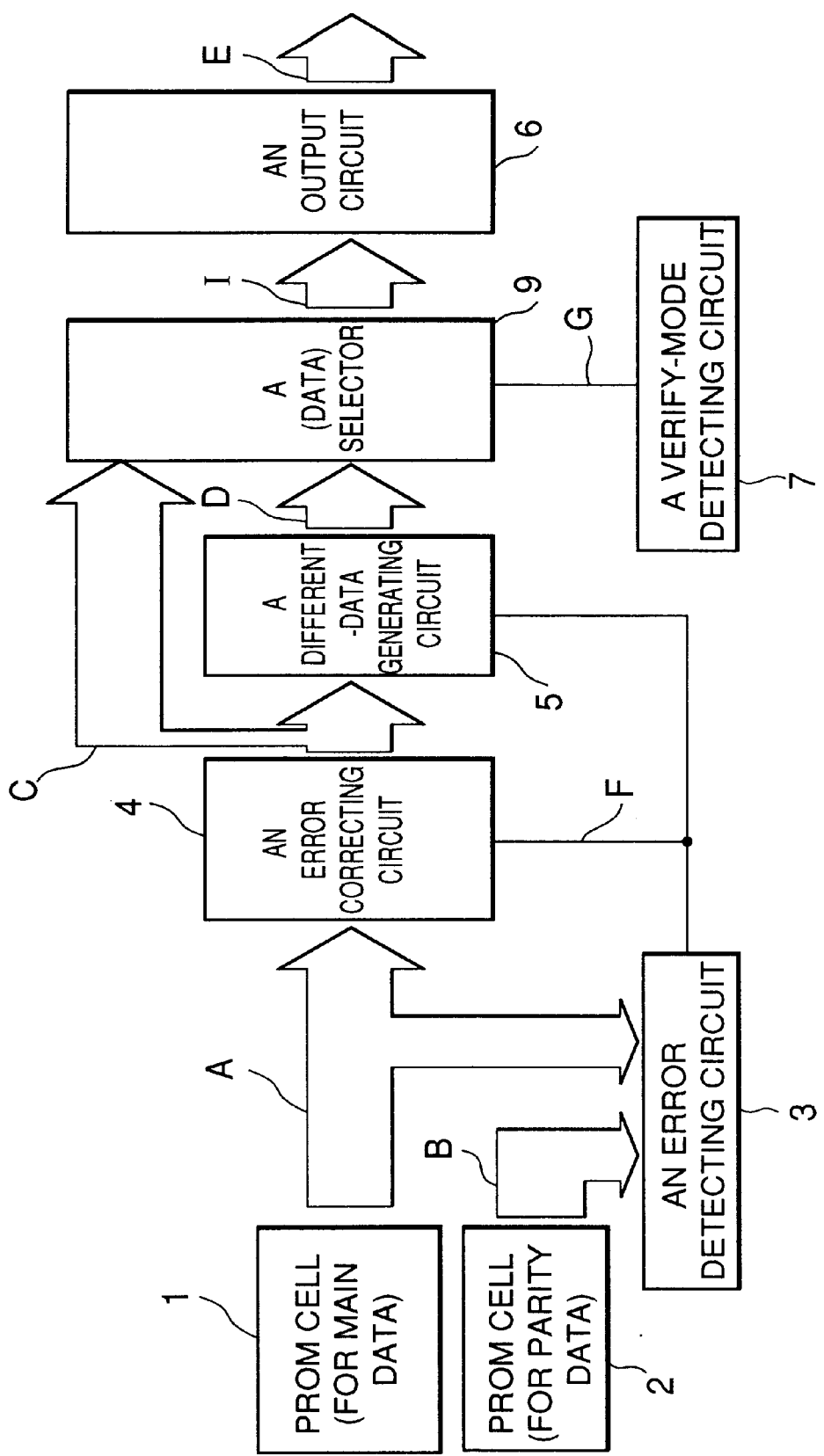
FIG. 3 is a block diagram showing a non-volatile semiconductor storage unit having a correction coding circuit in accordance with a second embodiment of the present invention.

A second embodiment of the present invention will be described with reference to FIG. 3.

A PROM cell 1 for main data outputs main data A to an error detecting circuit 3 and an error correcting circuit 4. A PROM cell 2 for parity data outputs parity data B to the error detecting circuit 3. The error detecting circuit 3 outputs an error detection signal F to the error correcting circuit 4 and a different-data generating circuit 5. The error correcting circuit 4 outputs data C to the different-data generating circuit 5 and a data selector 9. The different-data generating circuit 5 also outputs data D of the output signal to the data selector 9. Furthermore, a verify-mode detecting circuit 7 also outputs an output signal G to the data selector 9. The data selector 9 outputs data I of the output signal through an output circuit 6 as a final output E.

The error detecting circuit 3 compares the main data A with the parity data B to judge whether an error exists in the main data A or the parity data B, and outputs the error detection signal F of H level if there is an error and the error detection signal F of L level if there is no error. The error correcting circuit 4 corrects the data to output it as the data C if the error detection signal F is H level with respect to the main data A, and to output the data A as the data C without any change if the error detection signal F is L level. Since the error detection signal F is also inputted to the different-data generating circuit 5, if the detection signal F is H level, the error corrected data C is inputted to the data selector 9 as the data D different from the corrected data.

On the other hand, the output signal G of the verify mode detecting circuit 7 becomes H level in the verify-mode and L level in other modes. Since the signal G is inputted to the data selector 9, the data selector 9 selects the data C in the read-out mode and the data D in the verify mode to output the selected data.

Since the data selector 9 always selects the data C outputted from the error correcting circuit 4 and outputs the selected data C as the data I, the final output E is the data A as it is if there is no error in the data A, and the error corrected data C if there is an error therein. As in FIG. 1, since a case in which the data different from the data C is outputted as the final output E occurs only when the error detecting circuit 3 detects an error and the mode is the verify mode, it is found whether a defect of the main data A and the parity data B exists, or not, by only verification even in this embodiment.

Since it is found that no defect exists within the main data A and the parity data B if correct data can be read out at the time of verification in both of the first and second embodiments of the present invention, a troublesomeness for providing the expected value of the parity data B as well as an increase in work for examining the parity data is not required. Also, since it is found whether or not a defect exists in the main data A and the parity data B by conducting only verification, the PROM writer for a normal PROM can be used.

Although the invention has been described with reference to specific embodiments, this description is not meant to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. A semiconductor storage unit, comprising:

a first storage area storing main data;

a second storage area storing parity data corresponding to said main data;

an error detecting circuit detecting an error in said main data by using said parity data and generating an error detection signal when said error is detected;

an error correcting circuit receiving said main data and outputting said main data when said error detection signal is not generated and outputting an error-corrected data when said error detection signal is generated;

a mode circuit generating a specific-mode signal when said storage unit is placed in a specific mode; and a different-data generating circuit receiving the output of said error correcting circuit and generating new data different from said output when both of said error detection signal and said specific-mode detection signal are generated and allowing said output data to pass through said different-data generating circuit when at least one of said error detection signal and said specific-mode detection signal is not generated.

2. The unit as claimed in claim 1, wherein said specific-mode detecting circuit detects a verify mode to generate said specific-mode detection signal.

* * * * *